(12) United States Patent
Sugiyasu

(10) Patent No.: US 10,661,607 B2
(45) Date of Patent: May 26, 2020

(54) PNEUMATIC TIRE

(71) Applicant: BRIDGESTONE CORPORATION, Chuo-ku, Tokyo (JP)

(72) Inventor: Shinpei Sugiyasu, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/026,316

(22) PCT Filed: Jul. 4, 2014

(86) PCT No.: PCT/JP2014/003560
§ 371 (c)(1),
(2) Date: Mar. 31, 2016

(87) PCT Pub. No.: WO2015/059851
PCT Pub. Date: Apr. 30, 2015

(65) Prior Publication Data
US 2016/0236518 A1    Aug. 18, 2016

(30) Foreign Application Priority Data
Oct. 23, 2013   (JP) .................................. 2013-220253

(51) Int. Cl.
*B60C 11/03* (2006.01)
*B60C 11/13* (2006.01)

(52) U.S. Cl.
CPC ...... *B60C 11/0332* (2013.01); *B60C 11/0304* (2013.01); *B60C 11/0306* (2013.01);
(Continued)

(58) Field of Classification Search
CPC ..................... B60C 11/0332; B60C 11/0304
See application file for complete search history.

(56) References Cited

U.S. PATENT DOCUMENTS 5,012,847 A * 5/1991 Fukumoto ........... B60C 11/0306
152/209.18
5,720,831 A * 2/1998 Aoki ....................... B60C 11/00
152/29

(Continued)

FOREIGN PATENT DOCUMENTS

CN    102307736 A    1/2012
CN    102725152 A    10/2012
(Continued)

*Primary Examiner* — Leith S Shafi
*Assistant Examiner* — Nicholas R Krasnow
(74) *Attorney, Agent, or Firm* — Kenja IP Law PC

(57) ABSTRACT

The pneumatic tire of this disclosure includes on a tread surface at least one circumferential main groove having a groove width cyclically varying, and a lib-like land portion, wherein: among the lib-like land portions, a lib-like land portion disposed on at least one side of the circumferential main groove is formed in a shape such that: an outline shape of the lib-like land portion has a shape forming a protrusion, a tire widthwise position of the apex being equal on a tire circumference; a widthwise end portion adjacent to the circumferential main groove of the lib-like land portion is located on a side 0.3 mm or more inner than a position of the apex; an area on a tire widthwise end side of the tread surface of the lib-like land portion has a descending area with a width of 3% or more of the width of the lib-like land portion.

9 Claims, 2 Drawing Sheets

(52) U.S. Cl.
CPC ..... *B60C 11/1376* (2013.01); *B60C 2011/039* (2013.01); *B60C 2011/0334* (2013.01); *B60C 2011/0353* (2013.01); *B60C 2011/0381* (2013.01)

(56) References Cited

U.S. PATENT DOCUMENTS

| | | | | |
|---|---|---|---|---|
| 6,206,064 | B1* | 3/2001 | Takahashi | B60C 11/0302 152/209.24 |
| 6,213,180 | B1* | 4/2001 | Himuro | B60C 11/0302 152/209.15 |
| 6,302,174 | B1* | 10/2001 | Suzuki | B60C 11/0302 152/209.15 |
| 6,796,347 | B1* | 9/2004 | Matsuzaki | B60C 11/11 152/209.15 |
| 6,823,911 | B1* | 11/2004 | Himuro | B60C 11/0302 152/209.15 |
| 7,028,733 | B2* | 4/2006 | Ratliff, Jr. | B60C 11/0306 152/209.15 |
| 7,597,127 | B2* | 10/2009 | Mathews | B60C 11/11 152/209.18 |
| 8,322,386 | B2* | 12/2012 | Takahashi | B60C 11/0302 152/209.15 |
| 9,358,842 | B2* | 6/2016 | Kato | B60C 11/04 |
| 2003/0005992 | A1* | 1/2003 | Radulescu | B60C 11/01 152/209.3 |
| 2003/0047262 | A1* | 3/2003 | Kousaie | B60C 11/13 152/209.8 |
| 2004/0069389 | A1* | 4/2004 | Ratliff, Jr. | B60C 11/0302 152/209.15 |
| 2004/0221936 | A1* | 11/2004 | Kaiser | B60C 1/00 152/209.1 |
| 2007/0215258 | A1* | 9/2007 | Fukunaga | B60C 11/0302 152/209.18 |
| 2011/0061780 | A1 | 3/2011 | Mita | |
| 2012/0018068 | A1* | 1/2012 | Kiwaki | B60C 11/1353 152/209.18 |
| 2012/0132333 | A1* | 5/2012 | Ebiko | B60C 11/0309 152/209.8 |
| 2012/0247632 | A1* | 10/2012 | Hayashi | B60C 11/12 152/209.22 |
| 2013/0240101 | A1 | 9/2013 | Kameda | |
| 2014/0345764 | A1* | 11/2014 | Bourgeois | B60C 11/0332 152/209.15 |
| 2015/0328933 | A1* | 11/2015 | Kunugi | B60C 11/01 152/209.18 |
| 2019/0152276 | A1* | 5/2019 | Fu | B60C 23/0474 |

FOREIGN PATENT DOCUMENTS

| | | | | |
|---|---|---|---|---|
| CN | 102858560 A | | 1/2013 | |
| EP | 2535207 A1 | | 12/2012 | |
| JP | H0811508 A | * | 6/1994 | ..... B60C 2011/0344 |
| JP | 2002-321507 A | | 11/2002 | |
| JP | 2010-179892 A | | 8/2010 | |
| JP | 2011-148417 A | | 8/2011 | |
| JP | 2011-168223 A | | 9/2011 | |
| JP | 2011235701 A | * | 11/2011 | ........... B60C 11/042 |
| JP | 2012116389 A | | 6/2012 | |
| WO | 2011099515 A1 | | 8/2011 | |
| WO | 2012066714 A1 | | 5/2012 | |

* cited by examiner

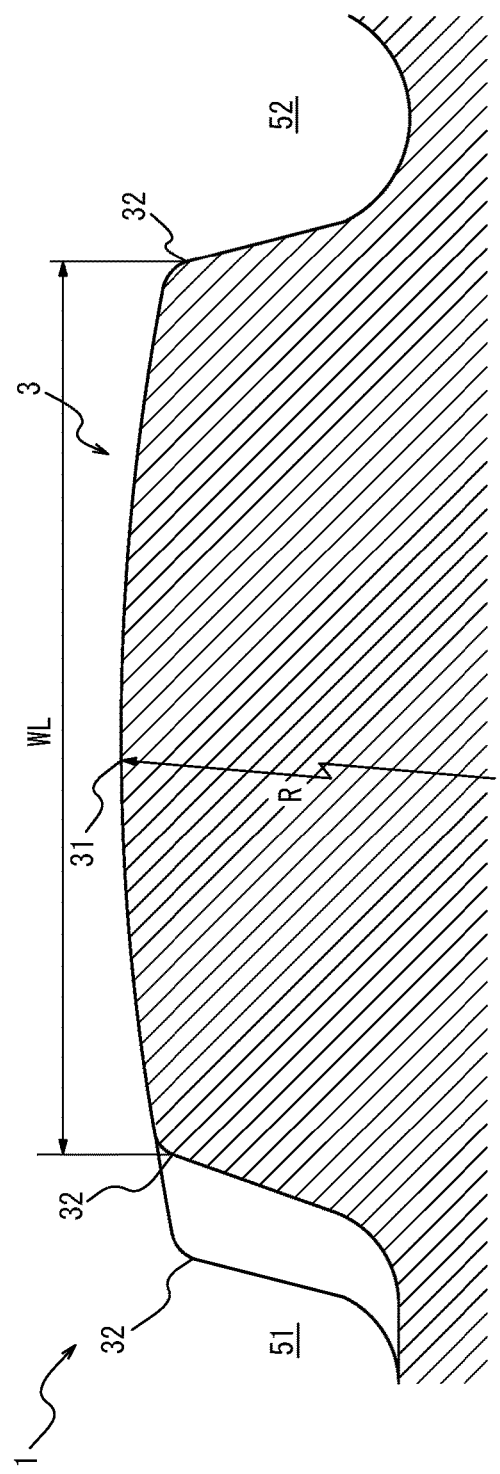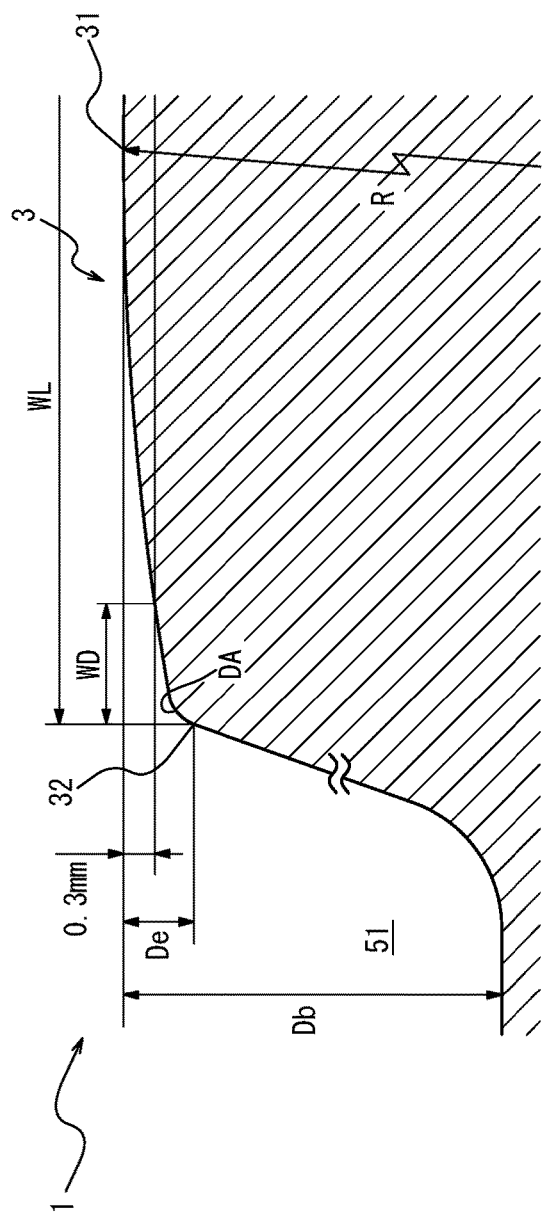

PNEUMATIC TIRE

TECHNICAL FIELD

This disclosure relates to a pneumatic tire.

BACKGROUND

Conventionally, various pneumatic tires, which ensure both the drainage performance and the rigidity of the land portion of the pneumatic tire, are proposed. Specifically, for example, in the pneumatic tire as shown in PTL 1, which has a rib-like land portion disposed on the tread surface, a circumferential main groove adjacent to the rib-like land portion is set as a groove with a groove width cyclically varying in a certain condition. Further, according to this tire, it is possible to suppress the deterioration in the drainage performance, even if in the case that the number of the lateral grooves crossing the main groove is reduced in order to improve the rigidity of the land portion.

CITATION LIST

Patent Literature

PTL 1: JP2010-179892A

SUMMARY

Technical Problem

However, regarding the pneumatic tire according to the aforementioned PTL 1, although it is possible to ensure the drainage performance, the rigidity of the land portion, or even the steering stability, there is a risk of the reduction in the silence of the tire. Namely, in the vicinity of the tire widthwise ends of the rib-like land portions, ordinarily, the ground contact pressure to the road surface has a tendency to be increased, while in the aforementioned tire, since the groove width of the circumferential main groove is varying and the tire widthwise ends of the rib-like land portions with a high ground contact pressure move in a zigzag direction in a planar view, there is a risk that pattern noise is generated and the silence is deteriorated.

Here, this disclosure is to provide a pneumatic tire ensuring both the steering stability and the drainage performance, and simultaneously improving the silence.

Solution to Problem

The pneumatic tire of this disclosure includes on a tread surface at least one circumferential main groove continuously extending in a tire circumferential direction and having a groove width cyclically varying in the tire circumferential direction, and a rib-like land portion forming a side wall surface on at least one side in a tire width direction of the circumferential main groove, wherein: among the rib-like land portions, a rib-like land portion disposed on at least one side in the tire width direction of the circumferential main groove is formed in a shape such that: in a tire widthwise cross sectional view, an outline shape of the rib-like land portion has a shape which forms a protrusion on an outer side in the tire radial direction, the protrusion having an apex at an outermost position in a tire radial direction, a tire widthwise position of the apex being equal on a tire circumference; in a tire widthwise cross sectional view, a widthwise end portion adjacent to the circumferential main groove of the rib-like land portion is located on a side 0.3 mm or more inner in the tire radial direction than a tire radial position of the apex; and an area on a tire widthwise end side inclusive of the widthwise end portion of the tread surface of the rib-like land portion has a descending area located on a side 0.3 mm or more inner in the tire radial direction than the tire radial position of the apex, the tire widthwise width of the descending area being 3% or more of the tire widthwise width of the rib-like land portion at the tire circumferential position of the descending area.

According to this configuration, it is possible to ensure both the steering stability and the drainage performance, while improving the silence.

In this disclosure, the dimensions refer to dimensions of a tire at unloaded condition, which is mounted to an applicable rim and applied a determined air pressure, if without specific limitations. Here, the "applicable rim" is a valid industrial standard for the region in which the tire is produced or used, and refers to a standard rim of an applicable size (the "Measuring Rim" in the STANDARDS MANUAL of the European Tyre and Rim Technical Organization in Europe (ETRTO), and the "Design Rim" in the "YEAR BOOK" of TRA (THE TIRE AND RIM ASSOCIATION INC.)) according to the "JATMA Year Book" of the Japan Automobile Tire Manufacturers Association in Japan, the "STANDARDS MANUAL" of ETRTO in Europe, or the "YEAR BOOK" of TRA in the United States of America. Moreover, a state that a tire mounted to an applicable rim is "applied a determined air pressure" refers to a state that the tire is mounted to an aforementioned applicable rim, and is applied an air pressure of a single wheel corresponding to a maximum load capability (a maximum air pressure) at applicable size and ply rating, as described by JATMA, etc. Further, the air mentioned here is substitutable with an inactive gas such as nitrogen gas and the like.

In this disclosure, the rib-like land portion refers to one not including a lateral groove with a groove width from one end to the other end of more than 1.5 mm, where the two ends are connected with grooves extending in the tire circumferential direction adjacent to the rib-like land portion and partitioning the rib-like land portion. Namely, as long as including a portion with a groove width of the lateral groove of 1.5 mm or less, the land portion is called "the rib-like land portion".

Moreover, in this disclosure, the "widthwise end portion" of the rib-like land portion refers to a boundary position between a groove wall of the circumferential main groove adjacent to the rib-like land portion and the tread surface, namely, an inflection point at which the groove wall connects with the tread surface in a tire widthwise cross sectional view.

In this disclosure, the "apex" of the rib-like land portion refers to a tire radial outermost position in a tire widthwise cross sectional view of the rib-like land portion.

Here, in the pneumatic tire of this disclosure, a descending amount, which is measured along the tire radial direction from the apex of the rib-like land portion to the widthwise end portion, is within a range of 5% to 20% of a land portion height measured along the tire radial direction from the apex to a groove bottom of the circumferential main groove adjacent to the widthwise end portion.

According to this configuration, it is possible to effectively improve the silence without causing unnecessary deterioration in the performance for braking, etc. of the tire.

In the pneumatic tire of this disclosure, the tire widthwise width of the descending area is preferably within 10% of the tire widthwise width of the rib-like land portion at the tire circumferential position of the descending area.

According to this configuration, it is possible to maintain the steering stability at a higher level.

In the pneumatic tire of this disclosure, the descending amount is preferably equal on the tire circumference.

According to this configuration, it is possible to further improve the silence.

In the pneumatic tire of this disclosure, in a tire widthwise cross sectional view, the outline shape of the rib-like land portion is preferably formed to include an arc on which the apex is located, the radius of curvature of the arc being equal in the tire circumferential direction.

According to this configuration, it is possible to further improve the silence.

Advantageous Effect

According to this disclosure, it is possible to provide a pneumatic tire ensuring both the steering stability and the drainage performance, and simultaneously improving the silence.

BRIEF DESCRIPTION OF THE DRAWINGS

In the accompanying drawings:

FIG. 2A is a drawing illustrating a cross section along an a-a line of the pneumatic tire in FIG. 1, and FIG. 2B is a partially enlarged view illustrating a cross section along an a-a line of the pneumatic tire in FIG. 1.

DETAILED DESCRIPTION

Figure 1:
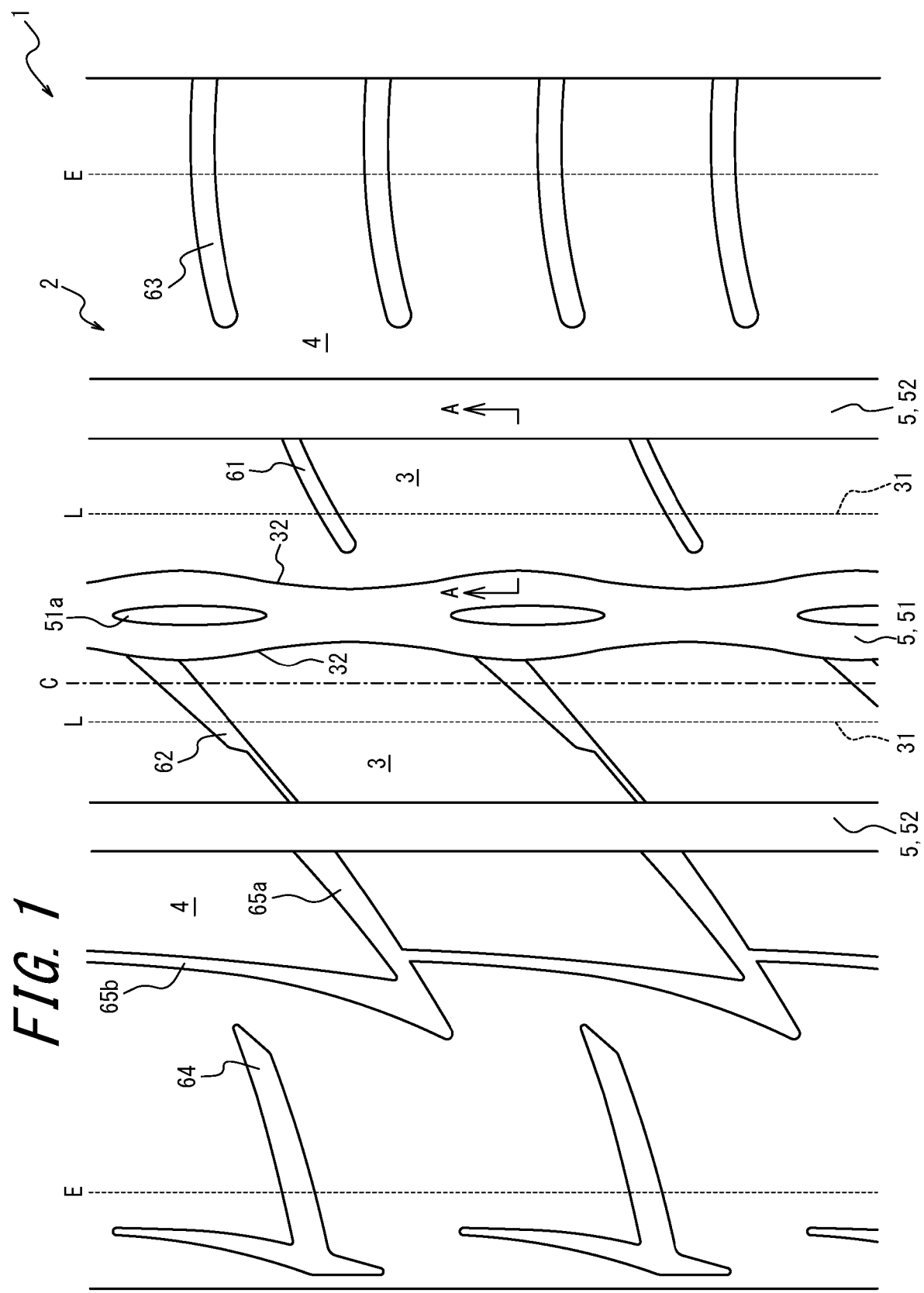
FIG. 1 is a development view illustrating a tread pattern of a pneumatic tire according to an embodiment of this disclosure.

Hereinafter, embodiments of this disclosure will be described based on the drawings.

FIG. 1 is a developed view illustrating a tread pattern of a pneumatic tire 1 according to an embodiment of this disclosure (hereinafter referred to as "the tire"). The tire 1, although partially omitted in the drawing, includes a carcass having a radial structure extending in a colloidal shape between the bead portions, a belt disposed on a tire radial outer side of the carcass of the tread portion, and a tread rubber disposed on a tire radial outer side of the belt so as to form a tread surface 2.

Here, as illustrated in FIG. 1, the tire 1 has circumferential main grooves 5 disposed on the tread surface in a manner continuously extending in the tire circumferential direction. The circumferential main grooves 5 include at least one (one in the drawing) circumferential main groove 51 having a groove width cyclically varying in the tire circumferential direction (hereinafter, a circumferential main groove with a groove width cyclically varying in the tire circumferential direction is referred to as a "varying-width circumferential main groove"). Further, in the tire 1 as illustrated, at least one varying-width circumferential main groove 51 is dispose on a tire center C side, and a linear circumferential main groove 52 with a determined groove width is disposed on a tire widthwise outer side other than the varying-width circumferential main groove 51.

In this tire 1, two rib-like land portions 3 forming a side wall surface of the varying-width circumferential main groove 51 are disposed on at least one side (two sides in the example of FIG. 1) in the tire width direction of the varying-width circumferential main groove 51. Moreover, in the illustrated example, circumferential main grooves 52 with a determined groove width are disposed on tire widthwise sides of the rib-like land portions 3 opposite to the varying-width circumferential main groove 51. Further, shoulder land portions 4 are disposed on a tire widthwise outer side of the circumferential main grooves 52 of shoulder areas of the tread surface 2. In other words, the rib-like land portions 3 are partitioned by the plurality of circumferential main grooves 5 disposed on the tread surface 2 (the varying-width circumferential main groove 51 and the circumferential main grooves 52 with a determined groove width), and the shoulder land portions 4 are partitioned by the circumferential main grooves 5 (the circumferential main grooves 52 with a determined groove width) and a tread ground contact edge E.

Here, on the rib-like land portions 3, as illustrated, lateral grooves 61 inclining relative to the tire width direction and having a groove width of, for example, more than 1.5 mm, are disposed, the lateral grooves 61 having one side opening to a circumferential groove 5 (the varying-width circumferential main groove 51 or a circumferential main groove 52 with a determined groove width), and the other side ending within a land portion. Moreover, on the rib-like land portions 3, lateral grooves 62 inclining relative to the tire width direction may be disposed, the lateral grooves 62 having two ends connected with circumferential grooves 5 and having a groove width of 1.5 mm or less in at least a part of the lateral groove 62. In this way, by disposing the lateral grooves 61 and 62, it is possible to properly reduce the rigidity of the rib-like land portions 3 and to further improve the silence. Further, by setting the groove width of at least a part of the lateral grooves 62 to 1.5 mm or less, when the lateral grooves 62 contact with the ground, the grooves are closed, or the land portions support each other, and thus the rigidity of the rib-like land portions 3 is not reduced too much.

Moreover, on the shoulder land portions 4, as illustrated, grooves may be disposed optionally, such as lug grooves 63 and 64 extending in a manner inclining relative to the tire width direction and opening at the tread ground contact edge E, and supplemental grooves 65 including slant groove portions 65a extending in a manner inclining relative to the tire width direction and ending within a land portion, and tire circumferential groove portions 65b connecting slant groove portions 65a adjacent in the tire circumferential direction.

Here, the varying-width circumferential main grooves 51 may be disposed instead of the circumferential main grooves 52 with a determined groove width as illustrated, in a manner such that the varying-width circumferential main grooves 51 are adjacent to the widthwise end portions 32 on both sides of the rib-like land portions 3. Alternatively, the tread pattern of tire 1 of this disclosure is not limited to the one as illustrated, but may be, for example, one in which the number of the rib-like land portions 3 is varied, or one symmetrical with respect to the tire center C.

The shape of the varying-width circumferential main groove 51 is not limited as long as having a groove width cyclically varying in the tire circumferential direction. For example, as illustrated in FIG. 1, the varying-width circumferential main groove 51 may have a shape such that in a planar view, a pair of groove walls are formed approximately into a sine wave shape shifted by half wavelength to each other in the tire circumferential direction. Moreover, in order to further improve the drainage performance, for example, a ridge 51a may be disposed on a groove bottom of a portion with a wide groove width within the varying-width circumferential main groove 51.

As illustrated in the tire widthwise cross sectional view in FIG. 2, the varying-width circumferential main groove 51 and the circumferential main grooves 52 with a determined groove width have groove walls with a linear shape in the cross section on both sides of the groove bottom.

As illustrated in FIG. 2, the rib-like land portions 3 adjacent to the varying-width circumferential main groove 51 are formed into a shape such that in a tire widthwise cross sectional view, an outline shape of the rib-like land portion 3 forms a protrusion on a tire radial outer side. In other words, in a tire widthwise sectional view, the rib-like land portions 3 have a shape such that central sides are protruded convexly on the tire radial outer side than the tire widthwise end sides, and simultaneously have apexes 31 at a tire radial outermost position.

Here, on a pneumatic tire having a tread surface on which rib-like land portions and circumferential main grooves adjacent to the rib-like land portion with a cyclically varying groove width are disposed, in the vicinity of the tire widthwise end portions of the rib-like land portions, the ground contact pressure toward the road surface has a tendency to be increased. In such tire, since the groove width of the circumferential main groove is varying and the tire widthwise end portions of the rib-like land portions with of high ground contact pressure move in a zigzag direction in a planar view, there was a risk that pattern noise is generated and the silence is deteriorated.

Then, in this tire 1, as illustrated in FIG. 2, in a tire widthwise cross sectional view, widthwise end portions 32 adjacent to the varying-width circumferential main groove 51 of the rib-like land portion 3 are located on a side 0.3 mm or more inner in the tire radial direction than the tire radial position of the apexes 31. Further, the tire widthwise width of the descending area DA (the descending area width WD of the descending area measured along the tire width direction) is 3% or more of the tire widthwise width of the rib-like land portion 3 (the rib-like land portion width WL measured along the tire width direction, between the widthwise end portions 32 located on both sides of the tire width direction of the rib-like land portion 3) at the tire circumferential position to measure the descending area width WD. Moreover, as illustrated with a broken line L in FIG. 1, the tire widthwise position of the apexes 31 of the rib-like land portion 3 is equal on the tire circumference. Namely, the apexes 31 are not moving in a zigzag direction in a planar view. Here, the descending area DA refers to an area located on a side 0.3 mm or more inner in the tire radial direction than the tire radial position of the apexes 31, within an area on the tire widthwise end side inclusive of the widthwise end portions 32 of the tread surface 2 of the rib-like land portion 3. Moreover, the apexes 31 have a tire radial position equal in the tire circumferential direction within the rib-like land portion 3.

The effects of this pneumatic tire 1 are described as follows.

According to the pneumatic tire 1 according to this disclosure, since in a tire widthwise sectional view, the widthwise end portions 32 adjacent to the varying-width circumferential main groove 51 of the rib-like land portions 3 are located on a side 0.3 mm or more inner in the tire radial direction than the tire radial position of the apexes 31, it is possible to reduce the ground contact pressure in the vicinity of the widthwise end portions 32 of the rib-like land portions 3, and to simultaneously increase the ground contact pressure in the vicinity of the apexes 31 of the rib-like land portions 3. Further, in the case that the widthwise end portions 32 are located on a side outer in the tire radial direction than a position 0.3 mm spaced from the tire radial position of the apexes 31, the ground contact pressure in the vicinity of the widthwise end portions 32 is not reduced sufficiently.

Moreover, in the case that the widthwise end portions 32 are located as mentioned above, if an outline shape of the rib-like land portions 3 is set as a shape symmetrical centering the apex 31 in a tire widthwise cross sectional view, the rib-like land portion width WL of the rib-like land portions 3 adjacent to the varying-width circumferential main groove 51 varies in the tire circumferential direction, rendering the apexes 31 with a high ground contact pressure move in a zigzag direction in the tire circumferential direction. Then, by setting the tire widthwise positions of the apexes 31 of the rib-like land portions 3 to be equal on the tire circumference, the portions within the rib-like land portions 3 with a high ground contact pressure have a same position on the tire circumference.

Further, even in the case that the widthwise end portions 32 are located on a side 0.3 mm or more inner in the tire radial direction than the tire radial position of the apexes 31, since the widthwise end portions 32 adjacent to the varying-width circumferential main groove 51 move in a zigzag direction in the tire circumferential direction, a portion with an insufficient descending area width WD in the tire circumferential direction is generated, and as a result, there is a risk that the ground contact pressure in the vicinity of the widthwise end portions 32 is not reduced uniformly enough in the tire circumferential direction. Then, by setting the descending area width WD to 3% or more of the rib-like land portion width WL at the tire circumferential position to measure the descending area width WD, it is possible to reduce the ground contact pressure in the vicinity of the widthwise end portions 32 without generating unevenness in the tire circumferential direction, and to sufficiently increase the ground contact pressure in the vicinity of the apexes 31.

Therefore, according to this tire 1, it is possible to suppress the unevenness in the tire circumferential direction and reduce the ground contact pressure of the widthwise end portions 32 adjacent to the varying-width circumferential main groove 51, and to increase the ground contact pressure in the vicinity of the apexes 31 which does not move in a zigzag direction in the tire circumferential direction. Further, in this case, it is possible to maintain the rigidity of the rib-like land portions 31 without deteriorating the drainage performance due to the varying-width circumferential main groove 51. Therefore, it is possible to ensure both the steering stability and the drainage performance, and to simultaneously improve the silence.

Here, in this embodiment, it is preferable that the widthwise end portions 32 are located on a side 0.3 mm or more inner in the tire radial direction than the tire radial position of the apexes 31, and simultaneously, a descending amount De measured from the apexes 31 to the widthwise end portions 32 along the tire radial direction is within a range of 5% to 20% of a land portion height Db measured from the apexes 31 to the groove bottom of the varying-width circumferential main groove 51 adjacent to the widthwise end portions 32 along the tire radial direction.

According to this configuration, it is possible to effectively improve the silence without causing unnecessary reduction in the performance for braking, etc. of the tire. Specifically, if the descending amount De is set to less than 5% of the land portion height Db, the ground contact pressure in the vicinity of the widthwise end portions 32 has a tendency to be difficult to reduce. Moreover, if the descending amount De is set to more than 20% of the land portion height Db, there is a risk that the widthwise end portions 32 do not contact with the road surface, and thus there is a tendency that the ground contact area of the tire 1 is reduced, for example, the performance for braking of the tire 1 is deteriorated.

Moreover, the descending area width WD may be set optionally as long as being 3% or more, but is preferably 10% or less of the rib-like land portion width WL. According to this configuration, it is possible to maintain the steering stability at a higher level. Specifically, if the descending area width WD is set to more than 10% of the rib-like land portions, there is a risk that the ground contact area is reduced during rotation of the tire 1, and thus the steering stability has a tendency to be reduced.

Moreover, the descending amount De measured from the apexes 31 to the widthwise end portions 32 adjacent to the varying-width circumferential main groove 51 along the tire radial direction may be set to different distances on the tire circumference as long as within the aforementioned range, but it is preferable that the descending amount De is equal on the tire circumference, namely, the tire radial position of the widthwise end portions 32 is equal within the rib-like land portions 3 in which the widthwise end portions 32 are located. According to this configuration, it is possible to maintain the ground contact pressure balance on the tire circumference in the vicinity of the widthwise end portions 32 adjacent to the varying-width circumferential main groove 51 during braking, etc., and to further improve the silence.

Moreover, tire widthwise position within the rib-like land portions 3 of the apexes 31 is preferably at a center of a position where a width measured along the tire width direction becomes a maximum width within the tire circumferential position of the rib-like land portions 3. This is because that in the rib-like land portions 3, the balance of the rigidity in the tire circumferential direction between both sides of the tire width direction with respect to the apexes 31 is improved.

As illustrated in FIG. 2(a), in a tire widthwise view, since it is possible to form the outline shape of the rib-like land portions 3 by combining one or more arcs or curved lines, it is preferable that the outline shape of the rib-like land portion 3 is formed to include an arc on which the apex 31 locate, and simultaneously, the radius of curvature R of the arc is equal in the tire circumferential direction.

When the ground contact pressure in the vicinity of the apexes 31 is comparatively increased, if the radius of curvature R of the arc forming the outline shape of the rib-like land portions 3 including the apexes 31 is different, there is a risk that the concentrating mode of the ground contact pressure in the vicinity of the apexes 31 becomes different on the tire circumference, and affects the silence of the tire 1. Therefore, by setting the radius of curvature R of the arc to be equal in the tire circumferential direction, the concentrating mode of the ground contact pressure becomes equal on the tire circumference, and it is possible to further improve the silence of the tire 1.

The outline shape of the rib-like land portions 3 is formed with an arc having a radius of curvature R, and is preferably, although omitted in the drawing, inclusive of two or more arcs in the descending area DA. By forming the outline shape of the descending area DA with two or more arcs, it is possible to effectively reduce the ground contact pressure in the vicinity of the widthwise end portions 32 almost without reducing the ground contact area. Moreover, in this case, it is preferable that the radius of curvature of the arc is reduced toward a tire widthwise outer side of the tread surface 2.

Furthermore, in a tire widthwise sectional view, the outline shape of the widthwise end portions 32 of the rib-like land portions 3 is a curved shape which is chamfered in FIG. 2, but may also be an angular shape which is not chamfered.

In the tire 1 of the present embodiment, the descending area DA is disposed on the widthwise end portions 32 of the rib-like land portions 3 adjacent to the varying-width circumferential main groove 51, while the descending area DA may be disposed on a widthwise end portions 32 of the rib-like land portions 3 adjacent to the circumferential main grooves 52.

Moreover, in the tire 1 of the present embodiment, the varying-width circumferential main groove 51 is disposed on one side (the tire center C side) in the tire width direction of the rib-like land portion 3 and the circumferential main groove 52 with a determined groove width is disposed on the other side (the tire widthwise outer side) in the tire width direction, while varying-width circumferential main grooves 51 adjacent to the rib-like land portion may be disposed on both sides in the tire width direction of the rib-like land portion 3, and the descending area DA may be disposed on the widthwise end portions 32 on one side or both sided in the tire width direction of the rib-like land portion 3. Moreover, it is possible as well to dispose the circumferential main groove 52 with a determined groove width on one side (the tire center C side) in the tire width direction of the rib-like land portion 3, to dispose the varying-width circumferential main groove 51 on the other side (the tire widthwise outer side) in the tire width direction, and to dispose the descending area DA on the widthwise end portions 32 on one side or both sides in the tire width direction of the rib-like land portion 3.

The width variation, which is a difference between a maximum width and a minimum width of the rib-like land portions 3 adjacent to the varying-width circumferential main groove 51, is preferably 20% or less of the maximum width of the rib-like land portion 3. If the variation is too large as exceeding 20%, there is a risk that it becomes difficult to obtain high silence even by applying the rib-like land portions 3 having a descending area DA according to this disclosure, while if being 20% or less, it is possible to sufficiently improve the silence by disposing a descending area DA according to this disclosure.

The foregoing has explained an embodiment of this disclosure with reference to the drawings. However, the pneumatic tire of this disclosure is not particularly limited to the aforementioned examples, and appropriate changes may be made to the pneumatic tire of this disclosure.

EXAMPLES

This disclosure will be described further in detail by Examples hereinafter without being restricted thereto by any means.

Example 1

The tire of Examples 1 has a size of 225/45R17 and a tread pattern as illustrated in FIG. 1. Specifically, the tire includes two rib-like land portions and one varying-width circumferential main groove between each rib-like land portion. Moreover, the tire further includes circumferential main grooves with a determined groove width on tire widthwise outer sides of each rib-like land portion, and shoulder land portions spaced by the circumferential main grooves. Moreover, each widthwise end portion of the two rib-like land portions adjacent to the varying-width circumferential main groove is located on a side 1.5 mm inner in the tire radial direction than tire radial positions of apexes of each rib-like land portion, and descending areas are formed inclusive of the widthwise end portions. The apexes of each rib-like land portion have a tire widthwise position equal on the tire circumference, and in a tire widthwise cross sectional view, a radius of curvature R of arcs inclusive of the apexes forming the outline shapes of the rib-like land portions is equal in the tire circumferential direction. Further, dimensions of the tire are configured as the specifications as shown in Table 1.

Examples 2 to 10

The tires of Examples 2-10 are the same as the tire of Examples 1, except that the specifications in Table 1 have been varied.

Comparative Examples 1-4

The tires of Comparative Examples 1-4 are the same as the tire of Examples 1, except that the specifications in Table 1 have been varied. Specifically, in the tire of Comparative Example 1, the widthwise end portions adjacent to the varying-width circumferential main groove are not located on a side inner than the tire radial position of the apexes in the tire radial position (the descending amount De is approximately 0 mm), and no descending area is formed. Moreover, in the tire of Comparative Example 3, the tire widthwise positions of the apexes of each rib-like land portion move in a zigzag direction in the tire circumferential direction.

Further, regarding the tires of Examples 1-10 and Comparative Examples 1-4, the performance is evaluated with the following method, and the result thereof is shown in Table 1.

(Silence Test)

As the silence test, each aforementioned sample tire was mounted to a rim with a size of 7.5J×17. The silence was evaluated via feeling assessment by a driver when travelling in various travelling modes on a test course on a dry road surface. The results of index evaluation are as shown in Table 1 by using the reciprocals of the test results of each sample tire, taking the tire of comparative example 1 as 100. The higher the value, the better silence is exhibited.

(Steering Stability Test)

In the steering stability test, each sample tire was mounted to a vehicle in the same conditions as the silence test. The steering stability was evaluated via feeling assessment by a driver of the performance for straight running and the performance for cornering when travelling in various travelling modes on a test course on a dry road surface. The results of index evaluation are as shown in Table 1, taking the tire of Comparative Example 1 as 100. The higher the value, the better steering stability is exhibited.

(Drainage Performance Test)

In the drainage performance test, each sample tire was mounted to a vehicle in the same conditions as the silence test. The driver drove into a pool with a water depth of 5 mm at a varying speed and evaluated the generating rate of hydroplaning. The results of index evaluation are as shown in Table 1, taking the tire of Comparative Example 1 as 100. The higher the value, the better drainage performance of the tire is exhibited.

(Performance for Braking Test)

In the performance for braking test, each sample tire was mounted to a vehicle in the same conditions as the silence test. The braking distance from a speed for hour of 100 km/h to a stationary state was measured by holding full brake on a test course on a dry road surface. The results of index evaluation are as shown in Table 1, taking the tire of Comparative Example 1 as 100. The higher the value, the better performance for braking is exhibited.

TABLE 1

|  | Comparative Example 1 | Comparative Example 2 | Comparative Example 3 | Comparative Example 4 | Example 1 | Example 2 | Example 3 |
|---|---|---|---|---|---|---|---|
| Descending amount De (mm) | 0 | 1.5 | 1.5 | 0.2 | 1.5 | 1.5 | 1.5 |
| Ratio of descending amount De to land portion height Db (%) | 0 | 15 | 15 | 2 | 15 | 15 | 15 |
| Ratio of descending area width WD to rib-like land portion width WL (%) | — | 2 | 4 | 4 | 4 | 3 | 5 |
| Tire widthwise position in tire circumferential direction of apex | Determined | Determined | Varying | Determined | Determined | Determined | Determined |
| Results  Silence | 100 | 100 | 100 | 100 | 105 | 105 | 105 |
| Steering stability | 100 | 100 | 100 | 100 | 100 | 100 | 100 |
| Drainage performance | 100 | 100 | 100 | 100 | 100 | 100 | 100 |
| Performance for braking | 100 | 100 | 100 | 100 | 100 | 100 | 100 |

|  | Example 4 | Example 5 | Example 6 | Example 7 | Example 8 | Example 9 | Example 10 |
|---|---|---|---|---|---|---|---|
| Descending amount De (mm) | 1.5 | 1.5 | 0.3 | 0.5 | 1 | 2 | 2.5 |
| Ratio of descending amount De to land portion height Db (%) | 15 | 15 | 3 | 5 | 10 | 20 | 25 |
| Ratio of lib-like land portion width WL to descending area width WD (%) | 10 | 15 | 4 | 4 | 4 | 4 | 4 |
| Tire widthwise position in tire circumferential direction of apex | Determined | Determined | Determined | Determined | Determined | Determined | Determined |
| Results  Silence | 105 | 105 | 103 | 105 | 105 | 105 | 105 |
| Steering stability | 100 | 98 | 100 | 100 | 100 | 100 | 100 |
| Drainage performance | 100 | 100 | 100 | 100 | 100 | 100 | 100 |
| Performance for braking | 100 | 100 | 100 | 100 | 100 | 100 | 98 |

As results of this test, in the tires of Examples 1 to 10, the widthwise end portions adjacent to the width-varying circumferential main groove are located on a side 0.3 mm or more inner in the tire radial direction than the tire radial position of the apex, the descending area width WD is set to 3% or more of the rib-like land portion width WL of the descending area width WD, and the tire widthwise position of the apex is equal in the tire circumferential direction. Therefore, the silence is improved comparing to Comparative Examples 1 to 4. Moreover, in the tires of Examples 1 to 4 and 6 to 10, the descending area width WD is set within a range of 3% to 10% of the rib-like land portion width WL. Therefore, the steering stability is sufficiently maintained comparing to the tire of Example 5 of which the value exceeds 10%. Further, in the tires of Examples 1 to 5 and 7 to 9, the widthwise end portion is located within a range in which the descending amount De is 5% to 20% of the land portion height Db. Therefore, the silence is improved comparing to the tires of Examples 6 and 10 which fall out of this range, and the performance for braking is sufficiently maintained.

INDUSTRIAL APPLICABILITY

According to this disclosure, it is possible to provide a pneumatic tire ensuring both the steering stability and the drainage performance, and simultaneously improving the silence.

REFERENCE SIGNS LIST

1 Pneumatic tire
2 Tread surface
3 Rib-like land portion
31 Apex
32 Widthwise end portion
4 Shoulder land portion
5 Circumferential main groove
51 Varying-width circumferential main groove
51a Ridge
52 Circumferential main groove (with a determined groove width)
61, 62 Lateral groove
63, 64 Lug groove
65 Supplemental groove
65a Slant groove portion
65b Tire circumferential groove portion
C Tire center
DA Descending area
Db Land portion height
De Descending amount
E Tread ground contact edge
L Broken line to show the position of the apex
R Radius of curvature
WD Descending area width
WL Rib-like land portion width

The invention claimed is:

1. A pneumatic tire comprising on a tread surface a varying-width circumferential main groove continuously extending in a tire circumferential direction and having a groove width cyclically varying in the tire circumferential direction, a pair of linear circumferential main grooves each extending continuously in a tire circumferential direction on a respective side of the varying-width circumferential main groove in a tire width direction and having a constant groove width, a pair of rib-like land portions each disposed between the varying-width circumferential main groove and respective one of the linear circumferential main grooves and forming a side wall surface on a respective side in a tire width direction of the varying-width circumferential main groove, wherein:
among the rib-like land portions, a first rib-like land portion disposed on one side in the tire width direction of the varying-width circumferential main groove is formed in a shape such that:
in a tire widthwise cross sectional view, an outline shape of the first rib-like land portion has a shape which forms a protrusion on an outer side in the tire radial direction, the protrusion having an apex at an outermost position in a tire radial direction,
a tire widthwise position of the apex being equal on a tire circumference;
in a tire widthwise cross sectional view,
a widthwise end portion adjacent to the circumferential main groove of the first rib-like land portion is located on a side 0.3 mm or more inner in the tire radial direction than a tire radial position of the apex;
an area on a tire widthwise end side inclusive of the widthwise end portion of the tread surface of the first rib-like land portion has a descending area located on a side 0.3 mm or more inner in the tire radial direction than the tire radial position of the apex, the tire widthwise width of the descending area being 3% or more of the tire widthwise width of the first rib-like land portion at a same position on the tire circumference; and
the descending area is formed of two or more arcs and a radius of curvature of the arcs is reduced toward a tire widthwise outer side of the tread surface;
in a planar view, a pair of groove walls of the varying-width circumferential main groove are formed into a sine wave shape shifted by half wavelength to each other in the tire circumferential direction to have a cyclically varying groove width;
a plurality of first lateral grooves disposed on the first rib-like land portion, the plurality of first lateral grooves have one side opening to the linear circumferential main groove and the other side ending within a land portion; and
the plurality of first lateral grooves incline relative to the tire width direction and extends toward a portion of the varying-width circumferential main groove having a narrow groove width, and wherein:
among the rib-like land portions, a second rib-like land portion disposed on the other side in the tire width direction of the varying-width circumferential main groove is formed in a shape such that:
a plurality of second lateral grooves disposed on the second rib-like land portion, the plurality of second lateral grooves have one side opening to the linear circumferential main groove and the other side opening to a portion of the varying-width circumferential main groove having a wide groove width;
the plurality of second lateral grooves incline relative to the tire width direction, and
a descending height, which is measured along the tire radial direction from the apex of the first rib-like land portion to the widthwise end portion, is within a range of 5% to 20% of a land portion height measured along the tire radial direction from the apex to a groove bottom of the circumferential main groove adjacent to the widthwise end portion.

2. The pneumatic tire according to claim 1, wherein: the tire widthwise width of the descending area is less than or equal to 10% of the tire widthwise width of the first rib-like land portion at a same position on the tire circumference.

3. The pneumatic tire according to claim 1, wherein: the descending height is equal on the tire circumference.

4. The pneumatic tire according to claim 2, wherein: the descending height is equal on the tire circumference.

5. The pneumatic tire according to claim 1, wherein: the radius of curvature of the arc forming the outline shape of the rib-like land portion is equal in the tire circumferential direction.

6. The pneumatic tire according to claim 2, wherein: the radius of curvature of the arc forming the outline shape of the rib-like land portion is equal in the tire circumferential direction.

7. The pneumatic tire according to claim 3, wherein: the radius of curvature of the arc forming the outline shape of the rib-like land portion is equal in the tire circumferential direction.

8. The pneumatic tire according to claim 4, wherein: the radius of curvature of the arc forming the outline shape of the rib-like land portion is equal in the tire circumferential direction.

9. The pneumatic tire according to claim 1, further comprising a ridge disposed on a groove bottom of a portion with a wide groove width within the varying-width circumferential main groove.

* * * * *